Aug. 2, 1949.  C. S. PIGGOT ET AL  2,477,648
RADIATION PROJECTOR
Filed March 7, 1945  4 Sheets-Sheet 1

INVENTORS
CHARLES S. PIGGOT
JESSE E. MACADAMS
BY Ralph L. Chappell
ATTORNEY

Aug. 2, 1949.    C. S. PIGGOT ET AL    2,477,648
RADIATION PROJECTOR
Filed March 7, 1945    4 Sheets-Sheet 2
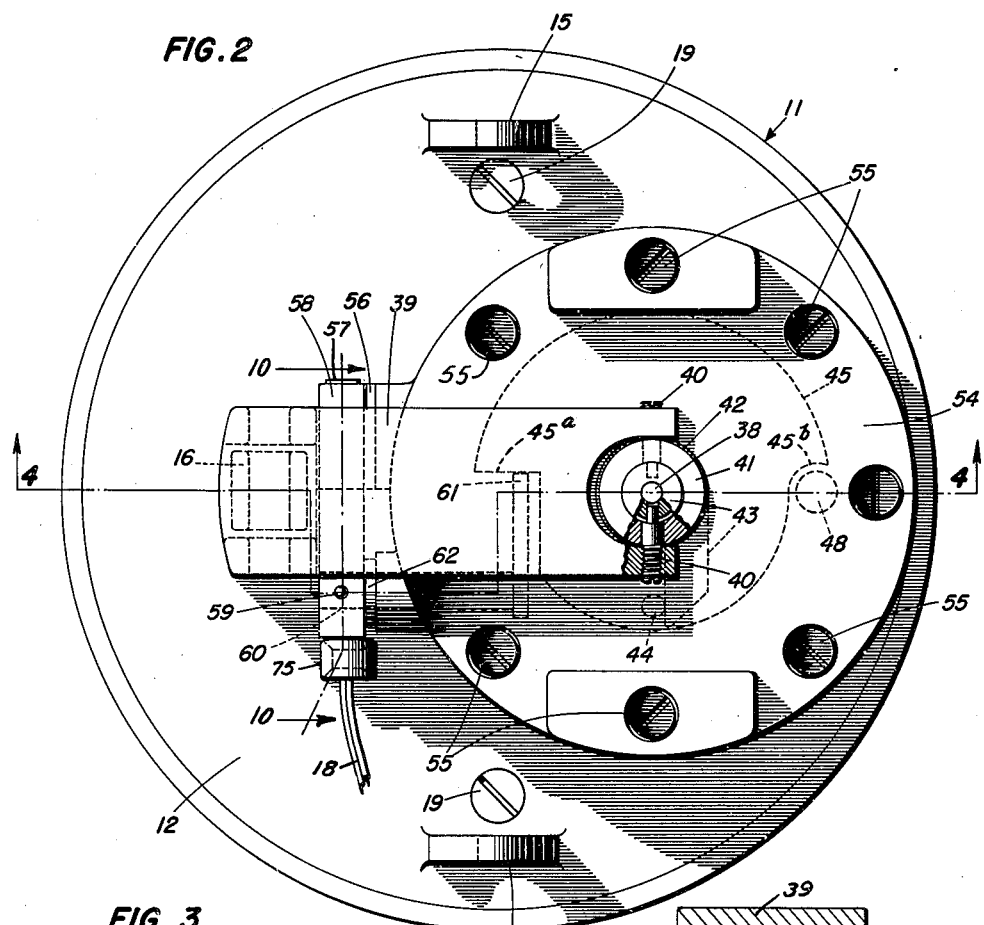
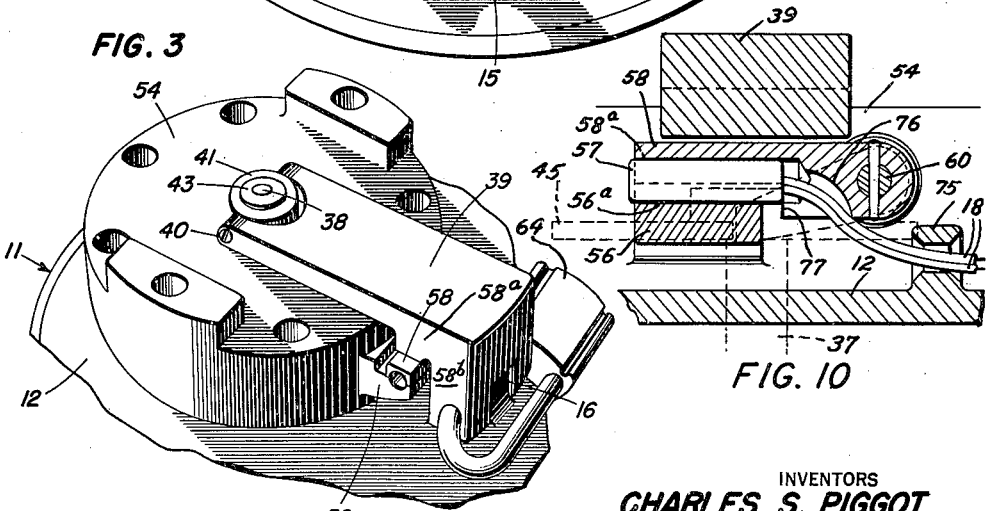
INVENTORS
CHARLES S. PIGGOT
JESSE E. MACADAMS
BY Ralph L. Chappell
ATTORNEY INVENTORS
CHARLES S. PIGGOT
JESSE E. MACADAMS
BY Ralph L Chappell
ATTORNEY

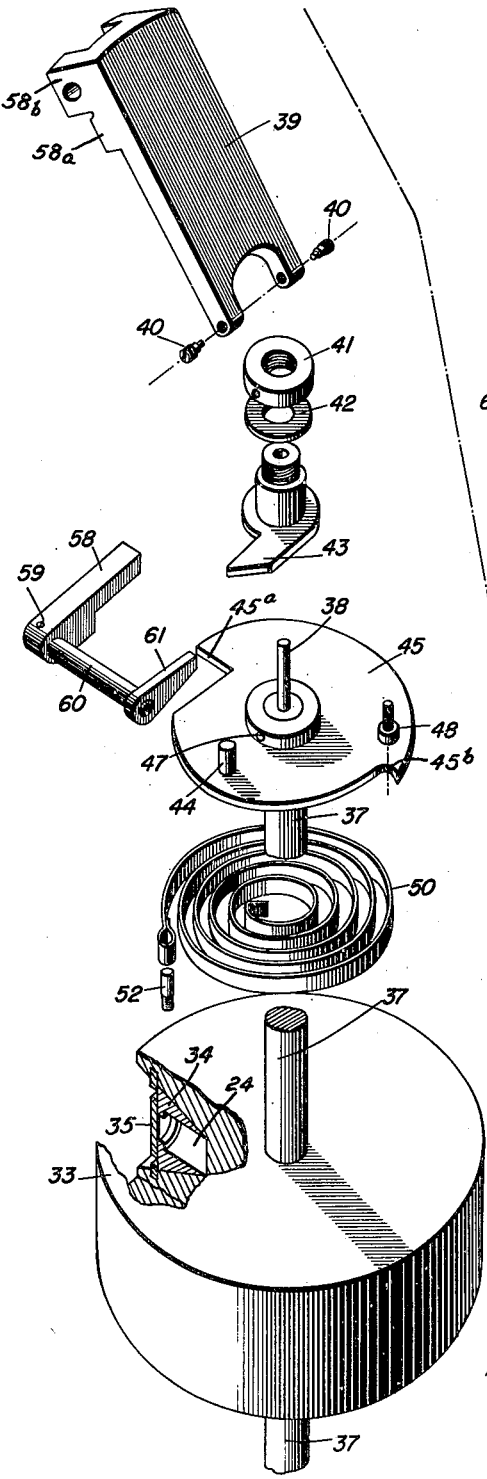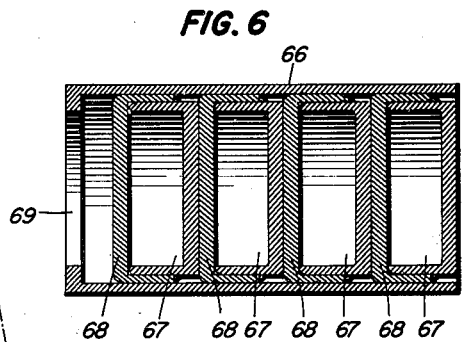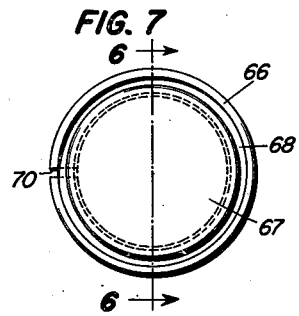

Patented Aug. 2, 1949

2,477,648

UNITED STATES PATENT OFFICE 2,477,648

RADIATION PROJECTOR

Charles S. Piggot, Washington, D. C., and Jesse Edward MacAdams, Takoma Park, Md.

Application March 7, 1945, Serial No. 581,532

15 Claims. (Cl. 250—108)

(Granted under the act of March 3, 1883, as amended April 30, 1928; 370 O. G. 757)

The present invention relates to radiation projectors and more particularly to such projectors of the type employing radioactive substances for projecting radiant energy through an object which is to be photographed or viewed on a fluorescent screen.

It is an object of the invention to provide an improved radiation projector which is simple and inexpensive in construction and reliable in operation.

It is a further object of the invention to provide a radiation projector incorporating new and improved safety devices for assuring exposure of the radioactive energy source when the projector is in use and insuring confinement of radiation from the source in such manner as to protect personnel who may be in the vicinity when the projector is not in use.

In accordance with the invention a radiation projector comprises a shielding and housing enclosure structure defining a chamber and comprising a housing element and a movable shielding element, a radiation source within this chamber, and remotely operable means for moving the movable element from a shielding position to a non-shielding position, thereby to expose the radiation source.

For a better understanding of the present invention, together with other and further objects thereof, reference is made to the following description taken in connection with the accompanying drawings, in which Fig. 1 is a perspective view of a preferred form of the present invention;

Fig. 2 is a top plan view of the same;

Fig. 3 is a fragmentary perspective view of the lock arm, setting lever collar, latch cover, and trigger mechanism, the projector being shown in the safe and shipping condition;

Fig. 5 is an exploded perspective view of the rotor together with the associated elements imparting or permitting motion of the rotor;

Fig. 6 is an elevational sectional view taken on line 6—6 of Fig. 7, of a radium capsule sleeve and associated elements adapted to be installed in the Fig. 1 embodiment;

Fig. 7 is an end elevation of the same;

Fig. 10 is a cross section taken on line 10—10 of Fig. 2, showing how the squib is nested under the trigger.

Figure 1:
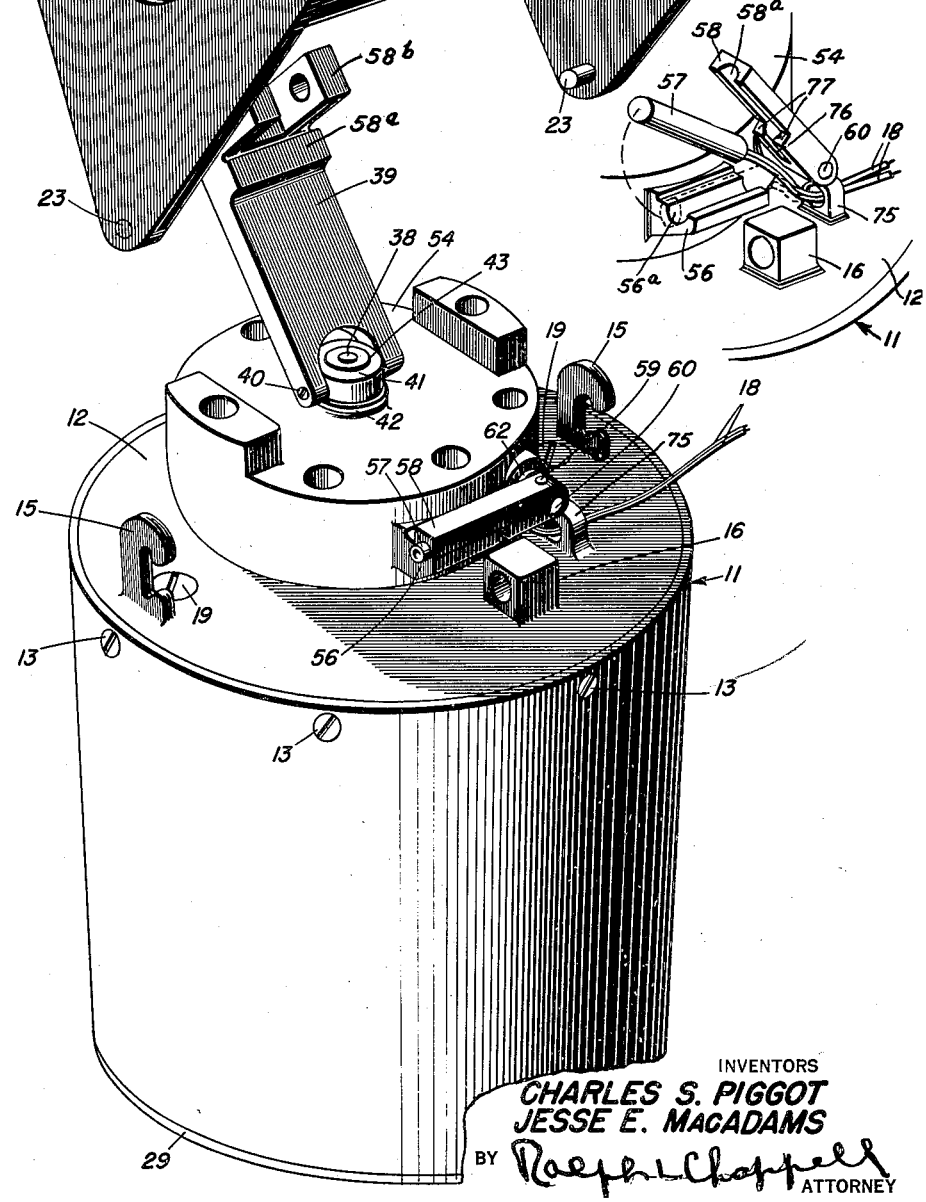

Referring now to the drawing, the projector is housed in a generally cylindrical casing 11 formed of a length of seamless brass tubing, one end of which is closed by a top plate 12, rigidly secured to the body casing as by screws 13 set into a circular flange 14 integral with plate 12. Upstanding from the top plate are a pair of hooks 15, adapted to engage the pins 23, one projecting from each end of the detachable carrying handle assembly 22 (Fig. 1) which may be provided with two spaced grip portions 21 to permit convenient carrying of the assembly by two men.

Figure 4:
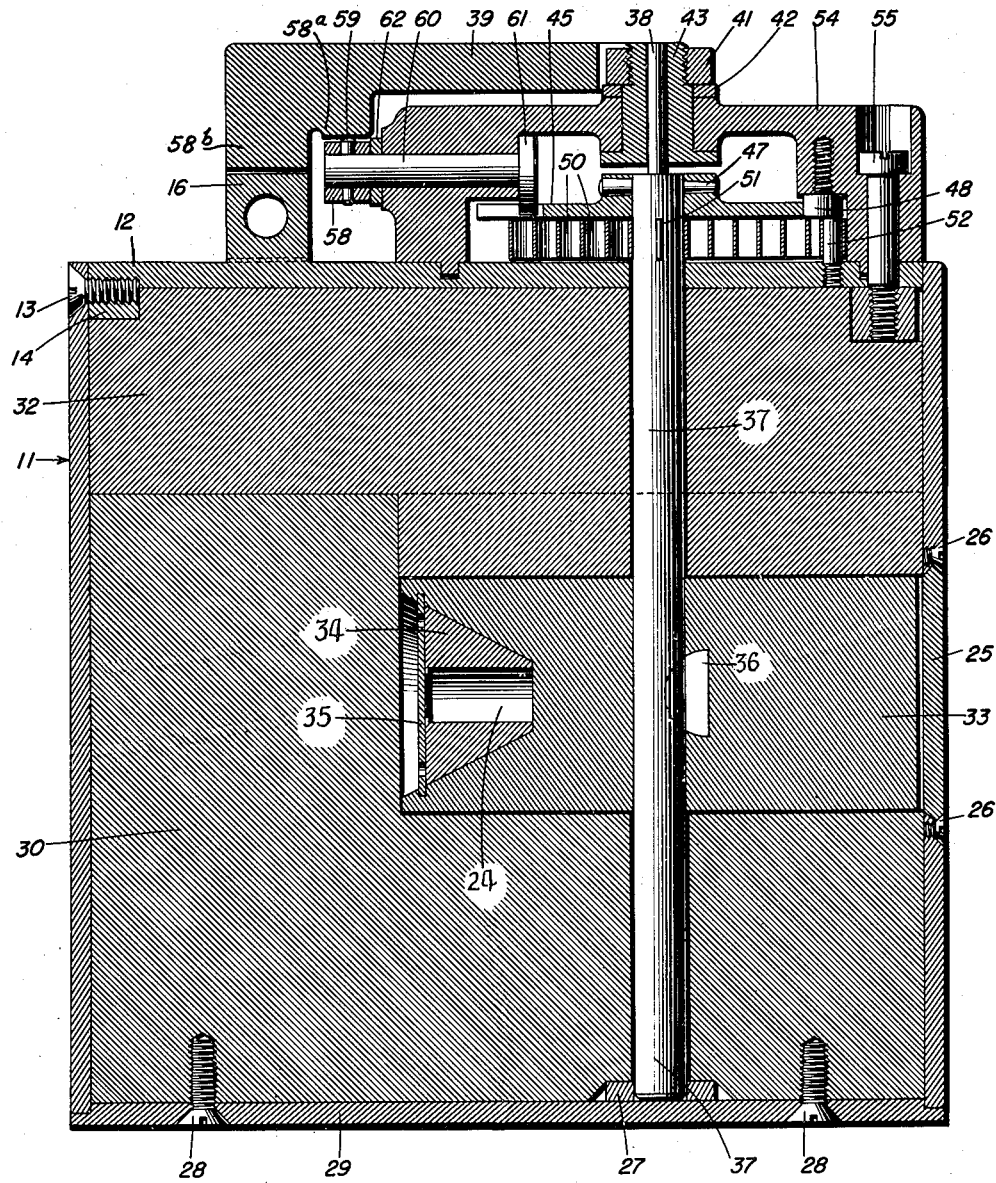
Fig. 4 is an elevational sectional view taken along line 4—4 of Fig. 2, looking in the direction of the arrows.
Figure 8:
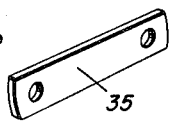
Fig. 8 is a perspective view of the radium capsule retainer plate.

Referring now specifically to Fig. 4, a circular window which also serves as an access hole is formed in the side of the casing and is closed by a disc 25 of aluminum or other material permeable by gamma rays. The window disc is removably secured to the casing by screws 26 and permits a gamma ray beam or other radiant energy from a radioactive source located in a pocket 24 to pass therethrough upon proper positioning of the rotor or shielding element 33 in which the pocket is formed. These elements will presently be described in greater detail.

Brazed to the interior of the bottom plate 29 of the casing is a washer 27 forming a bearing base for the rotor shaft 37. The interior of the casing is substantially filled by the shielding blocks 30, 32, of lead forming a shielding and housing enclosure, although a cylindrical cavity or chamber is formed adjacent the window 25. The blocks 30, 32 are held in position by screws 28 and 19. The shielding or barrier blocks may be precast, and preferably include six percent antimony, the remainder being lead, as above indicated. The cavity in the lower block is formed eccentric but axially parallel with respect to the axis of the casing and shaft 37 extends axially through the cavity, carrying the rotor element 33, a wall portion of which lies directly behind the window 25. The rotor 33 is also made of lead, constituting a movable shielding element and is fast at 36 on shaft 37 to turn therewith. An aluminum capsule container 34, generally frusto-conical in shape, is secured in a pocket provided in the rotor by an aluminum retainer plate 35 bearing against cutout portions in the wall of the pocket. The capsule sleeve and contents shown in Fig. 6 are adapted to be inserted in pocket 24, with aperture 69 positioned adjacent to plate 35.

It will be noted that when rotor is in the position in which it is shown in Fig. 4, the capsule container is in a protected position effectively surrounded by substantial masses of lead, while by turning the rotor the capsule may be brought to a position directly under the window, permitting escape of the radiation therethrough.

Reference is made to Fig. 5 in the description of the elements which cause rotary motion of shaft 37 and therefore of shielding rotor 33. Shaft 37 is moved in one direction to place the capsule container in the protected position by the turning of a lock arm 39 about the longitudinal axis of the shaft. The lock arm is pivotally mounted on trunnions 40 to a setting lever assembly comprising a collar 41, washer 42, and a setting lever 43. Said lock arm has lugs 58a, 58b, the latter of which is longest, is bifurcated and has registering holes. When lock arm 39 is turned in a clockwise direction, viewed from above, as in Fig. 2, the flat blade surface of setting lever 43 impels stop pin 44 on the latch disc 45 in a clockwise direction until a latch 61 falls into and engages a shoulder 45a formed by a cutout portion of the disc. Disc 45 is pinned at 47 to shaft 37, so that the above-described motion is effective to place the capsule container in the secreted position shown in Fig. 4. The hub of lever 43 is freely mounted on extension 38 of shaft 37. A bumper 48, mounted on a combined cover and bearing portion 54, is engageable by a stop 45b of the disc which then prevents further clockwise movement of the disc, as more fully appears by reference to Fig. 2.

Cut in the shaft 37 is a slot 51 and rigidly secured to the cover plate 12 is a brass spring pin 52. Between and reacting against the abutments so formed is a secondary driving means consisting of a spiral spring 50 which normally urges the rotor in a counterclockwise direction towards the exposing position of the radium. Such rotation of the disc 45 is prevented by setting lever 43 at the proper time in the later operation until lock arm 39, constituting a primary and manually drivable means, is swung desirably more than 180° in a counterclockwise direction to move the setting lever blade out of the way of stop pin 44. The lever 43 is then located approximately 180 mechanical degrees, desirably more than 180° as stated, away from the position illustrated in Fig. 3. The eventual counterclockwise movement of the disc 45 is limited then by the contact of the shoulder 45a of the disc with bumper 48. The reason for swinging the lock arm 39 in excess of 180° is to make sure that there is no impediment to the shoulder 45a in reaching the bumper 48, as it must to establish the full registration of the radium capsule with the window 25. If the lock arm 39 were stopped short of a 180° swing, the lever 43 would intercept the stop pin 44 before the shoulder 45a arrived at the bumper 48 and thereby prevent the foregoing registration. The length of the blade 43 and the radial position of the stop pin 44 are such as to permit clearance of bumper 48.

Figure 9:
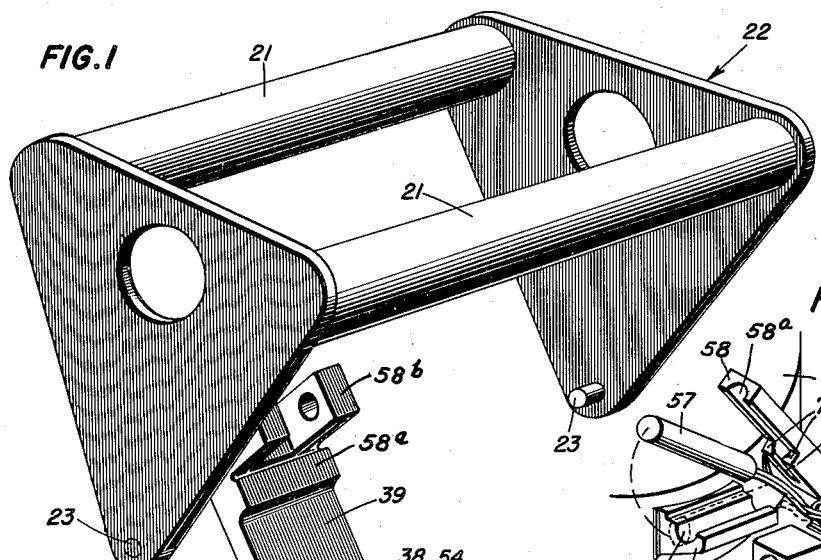
Fig. 9 is a perspective view of a portion of the structure in Fig. 1, illustrating the manner of introducing the squib and its wires.

Trigger means is provided for releasing the above-described closure maintaining means by remote control when exposure of the radioactive source is desired. The last-mentioned means comprises a trigger 58 secured by a pin 59 to a shaft 60 integral with latch 61, as shown in Fig. 5. The trigger rests on an extended portion 56 of the latch cover 54 (illustrated in Fig. 1) when the rotor is in the protective position. The trigger and extended portion 56 are formed with semicircular recesses 58a, 56a (Figs. 9 and 10) adapted to confine therebetween a firing squib 57, which firing squib has an attached two-strand wire 18 leading off from it for connection to a source of current. Preparatory to emplacing the squib (Fig. 9), the wire is pulled through the hole in an adjacent anchor lug 75 most of its length and the squib is then laid in the recess 56a. When the trigger 58 is swung down (Fig. 10) so that its recess 58a completes the enclosure of the squib, the wire trails through a slot 76 a little more than wide enough to contain it, and a shoulder 77 abuts the wire end of the squib. The squib cannot readily be dislodged toward the left (Fig. 10), and a pull on the wire, accidental or otherwise, will only draw the squib against the shoulder 77 and thus prevent dislodgment toward the right. The latch cover is mounted on the end plate by screws 55.

Referring now specifically to Fig. 3 of the drawings a padlock 64, having a staple projecting through projection 16 and the forked lug 58b on lock arm 39 secures the lock arm assembly in the safe position so that the radioactive source is protected from exposure. It will be noted that when in position shown the lug 58a of the lock arm bears on trigger 58 and prevents release of the latch 61 from the latch disc 45.

In Figs. 6 and 7 are shown the details of the contents of the capsule container 34. The radioactive source material such as radium is placed in a plurality of silver bodies 67 each of which has soldered thereto a silver cover 68. The elements 67, 68 are placed in a generally tubular silver capsule sleeve 66 which is formed with an end aperture 69 and a longitudinal slot 70.

In the description of the operation of the preferred form of the invention the protected condition of the radiant energy source as illustrated in Figs. 2, 3 and 5 will first be assumed. When it is proposed to examine or photograph an object by means of the beam from the radioactive substance in pocket 24, lock 64 is removed, lock arm 39 is swung upwards on the axis of trunnions 40 toward and beyond the position illustrated in Fig. 1, trigger 58 is manually lifted high enough (Fig. 9) for the emplacement of the squib 57 on the squib support 56, and the wire 18 is pulled through the anchor lug 75 and coupled through an open switch to a suitable source of electric current. Although the lifting of the trigger 58 interrupts the former double lock by lifting the latch 61 from engagement with the shoulder the blade of setting lever 43 still obstructs stop pin 44 to prevent rotation of disc 45 through the then existing single lock and exposure of the radium. The trigger 58 is closed down on the squib (Fig. 1), restoring the latch 61 to reengagement with shoulder 45a to again double lock the disk 45 against movement. The lock arm 39, still virtually inverted and 180° away from the position on Fig. 2, is swung counterclockwise until it reassumes the position in Fig. 2, but upside down. The arm then rests on top of the cover 54 in spaced relation to the trigger, in which position it acts as a stop for the trigger when driven up by the explosion of the squib. The displacements of both the trigger and latch 61 are thus limited. The consequent counterclockwise turn of setting lever 43 to the position 180° up from the showing in Fig. 2 leaves the stop pin 44 unobstructed, the disc 45 now being held by the single lock at 61, 45a. The mechanism is now in the unsafe position so that upon operation of the trigger 58 the radium can be exposed. At the instant of firing, the electrical circuit including wires 18 is closed, with the result that current flows through firing squib 57. Detonation of the squib causes trigger 58 to separate from projecting portion 56 and to rotate shaft 60, thereby disengaging latch 61 from the squared shoulder formed by the cut-out portion of disc 45. Spring 50 forces the disc to move in a counterclockwise direction through 180 degrees until the shoulder portion strikes bumper 48, biasing the rotor 33 to the radium-exposing position. At this time retainer plate 35 is adjacent window 25 and the radiant energy is projected therethrough.

When it is desired again to secrete the radium, lock arm 39 still inverted, is swung back in the clockwise direction, 180° away from the position in Fig. 2, causing counter-rotation of the rotor 33 to the protected position, until latch 61 again catches on the shoulder 45a and until the stop 45b strikes bumper 48. The lock arm is then reversed on its trunnions 40 to the position illustrated in Fig. 3, assuming its original position, pressing down on the trigger 58 which is appropriately restored to its former position, so that its latch 61 prevents movement of the disc at one point, the setting lever obstructs stop pin 44 and prevents movement of the disc at a second point, the lock arm prevents movement of trigger 58, spring 50 is flexed, and the apparatus is restored to its original safe position in which it may or may not be secured by the padlock 64.

While there has been shown what is at present considered to be the preferred embodiment of the invention, it will be apparent to those skilled in the art that various modifications and changes may be made therein without departing from the spirit of the invention and the claims appended hereto.

The invention herein described may be manufactured and used by or for the Government of the United States of America for governmental purposes without the payment of any royalties thereon or therefor.

We claim:

1. A radiation projector of the type adapted selectively to position a radiant energy source either in a protected position or an exposed position comprising a shielding and housing mass having a chamber formed therein, said chamber being formed with an open portion and a closed wall portion, rotor means disposed in and having surfaces complementary to said chamber, said rotor means being formed with a pocket adapted to contain said source, and means for rotating said rotor means selectively to position said pocket in communication with said open portion or said wall portion.

2. A radiation projector of the type adapted selectively to position a radiant energy source either in a protected position or an exposed position comprising a pair of mating protecting blocks disposed to form a chamber therebetween, said chamber being formed with an open portion and a closed wall portion, rotor means disposed in and having surfaces complementary to said chamber, said rotor means being formed with a pocket adapted to contain said source, a shaft rotatably mounted in said protecting blocks and rigidly secured to said rotor, driving means connected to said shaft adapted to bias said rotor to the exposed position and a manually drivable means mounted on said shaft adapted to enable counter-rotation of said rotor to the protected position, whereby the pocket containing said source in the rotor may be selectively rotated to the position of exposure communicating with said open portion or to the protected position in contact with said wall.

3. In a radiation projector of the type including a fixed housing member and a rotatable shielding member adapted to cooperate therewith to secrete a source of radiant energy when the rotatable member is in a closed position and to expose said source when the last-mentioned member is in another position, a closure operator comprising a shaft rotatably mounted in said housing member and rigidly secured to said shielding member, a disc concentrically secured to said shaft, a setting lever rotatably mounted on said shaft and operative to engage said disc, driving means mounted on said shaft adapted to rotate said setting lever thereby to rotate said member to the closed position, and latching means operative to engage said disc, thereby to maintain said rotor in said closed position.

4. In a radiation projector of the type including a fixed housing member and a rotatable shielding member adapted to cooperate therewith to secrete a source of radiant energy when the rotatable member is in a closed position and to expose said source when the last mentioned member is in another position, a closure operator comprising a shaft rotatably mounted in said housing member and rigidly secured to said shielding member, a disc concentrically secured to said shaft, a setting lever rotatably mounted on said shaft and operative to engage said disc, thereby to rotate said member to the closed position, latching means operative to engage said disc, thereby to maintain said rotor in said closed position, means for rotating said member to said other position upon disengagement of said latching means from said disc, and means for disengaging said setting lever from said disc, thereby to permit rotation of said member to said other position.

5. In a radiation projector of the type including a fixed housing member and a rotatable shielding member adapted to cooperate therewith to protect a source of radiant energy when the rotatable member is in a closed position and to expose said source when the last-mentioned member is in another position, a closure operator comprising a shaft rotatably mounted in said housing member and rigidly secured to said shielding member, means for maintaining said shielding member in a closed position, means normally biasing said shielding member toward an exposed position, and trigger means for releasing said closure means to permit said biasing means to move said shielding member to said exposed position.

6. In a radiation projector of the type including a fixed housing member and a rotatable shielding member adapted to cooperate therewith to secrete a carried source of radiant energy when the rotatable member is in a closed position and to expose said source when the last-named means is in another position, a shaft rotatably mounted in said housing member, said shaft having a stop pin and being rigidly secured to said shielding member, a setting lever loose on said shaft and adapted to assume a pin-intercepting position, driving means connected to the shaft and biasing said shielding member to the exposing position, latching means for maintaining said shielding member in said closed position, trigger means for releasing said latching means, and manually operable means normally bearing on said trigger means and preventing operation thereof for disengaging the latching means, said manually operable means having the setting lever connected to it and being movable off of the trigger to place the setting lever in position to intercept the pin upon release of the latching means, thereby to permit rotation of said member to said other position.

7. A radiation projector comprising a shielding and housing structure defining a chamber, a movable shielding element mounted within said chamber, a radiation source within said movable element, and remotely controllable means, including a detonation operated release, for moving said movable element from a shielding position to a non-shielding position, thereby to expose said radiation source.

8. A radiation projector comprising a shielding and housing structure defining a chamber, a movable shielding element mounted within said chamber, a radiation source within said movable element, detent means for maintaining said movable element in a shielding position, means normally biasing said shielding element toward an exposed position, and remotely controllable means, including a detonation operated release, for displacing said detent means to release said movable element for movement by said biasing means from a shielding position to a non-shielding position, thereby to expose said radiation source.

9. A radiation projector comprising a shielding and housing enclosure defining a chamber, a movable shielding element in the chamber, an inherently active radiation source secreted in the shielding element, means biased to tend to move said movable element from a shielding position to a non-shielding position thereby to expose said radiation source, latch means restraining said biased means, and explosive means which is operable to displace the latch means instantaneously upon detonation.

10. A radiation projector comprising a shielding and housing enclosure defining a chamber, a movable shielding element in the chamber, an inherently active radiation source secreted in the shielding element, means biased to tend to move said movable element from a shielding position to a non-shielding position thereby to expose said radiation source, latch means restraining said biased means, and electrically detonable explosive means which is operable to displace the latch means instantaneously upon detonation.

11. A radiation projector comprising a shielding and housing enclosure defining a chamber, a movable shielding element in the chamber, an inherently active radiation source secreted in the shielding element, means biased to tend to move said movable element from a shielding position to a non-shielding position thereby to expose said radiation source, latch means restraining said biased means, explosive means which is operable to displace the latch means instantaneously upon detonation, and an arm manually operable to move said element to the shielding position, said arm then assuming a position to limit the displacement of the latch means by force of the explosion.

12. A radiation projector comprising a shielding and housing enclosure defining a chamber, a movable shielding element in the chamber, an inherently active radiation source secreted in the shielding element, means biased to tend to move said movable element from a shielding position to a non-shielding position thereby to expose said radiation source, latch means restraining said biased means, an explosive-operable trigger connected with the latch means and operable to displace the latch means, and an arm manually operable to move said element to the shielding position said arm then overlying the trigger to limit the displacement of the trigger and latch by force of the explosion.

13. A radiation projector consisting of a shielding and housing enclosure, a radiation source-container movable in said enclosure between shielding and exposing positions, biasing means tending to move said container to the exposing position, individual lock means for the container, including a shoulder and latch couple and stop pin and setting lever couple, forming a double lock holding said container against movement in the shielding position, an arm connected with the setting lever, being movable to displace the setting lever from the stop pin to a position beyond coincidence with the exposing position thus confining the holding function to the shoulder and latch couple, means for displacing the latch of said couple from the shoulder enabling the biasing means to work, and a bumper intercepting the shoulder in the exposing position of the container.

14. In an explosive-controlled radiation projector, a radiation source-container movable between shielding and exposing positions, latch means for holding the container in the shielding position, said latch means including a squib support and a pivoted trigger having a shoulder, and an anchor lug fixed externally of but adjacent to the pivot, said lug having a hole through which the wire of a squib is pulled until the wire end of the squib is abuttable by the shoulder when the trigger is swung down on the squib on the squib support.

15. A radiation projector of the type adapted to selectively position a radiant energy source either in a shielded position or an exposed position, comprising a shielding and housing mass having a chamber formed eccentrically therein to provide an open portion peripherically of the mass and a closed wall substantially in the center of the mass, rotor means disposed in and having surfaces complementary to said chamber, said rotor means being formed with a pocket adapted to contain said source, means for rotating said rotor means selectively to position said pocket in communication with said open portion or said wall, and a closure for said open portion, shielding the rotor means against dirt and damage and consisting of a material permeable by the rays from said source.

CHARLES S. PIGGOT.
JESSE EDWARD MacADAMS.

REFERENCES CITED

The following references are of record in the file of this patent:

UNITED STATES PATENTS

| Number | Name | Date |
|---|---|---|
| 1,156,906 | Kelly | Oct. 19, 1915 |
| 2,224,077 | Haupt | Dec. 3, 1940 |
| 2,257,050 | Goldfield | Sept. 23, 1941 |
| 2,277,756 | Hare | Mar. 31, 1942 |
| 2,316,361 | Piety | Apr. 13, 1943 |